United States Patent [19]
Oberlin et al.

[11] Patent Number: 6,064,196
[45] Date of Patent: May 16, 2000

[54] APPARATUS AND METHOD FOR CALCULATING MUZZLE VELOCITY

[75] Inventors: Richard P. Oberlin, Phoenix; Doug R. Cullison, Hampstead, both of Md.

[73] Assignee: AAI Corporation, Hunt Valley, Md.

[21] Appl. No.: 09/001,694

[22] Filed: Dec. 31, 1997

[51] Int. Cl.[7] .................................................. G01P 3/66
[52] U.S. Cl. ............................................. 324/179; 73/167
[58] Field of Search .............................. 324/207.17, 178, 324/179, 207.15, 207.16; 336/45, 129; 73/167; 340/870.31; 346/38; 368/108

[56] References Cited

U.S. PATENT DOCUMENTS

| | | | |
|---|---|---|---|
| 3,659,201 | 4/1972 | Vogelsang | 324/179 |
| 3,787,770 | 1/1974 | Cote et al. | 324/179 |
| 3,824,463 | 7/1974 | Oehler | 324/179 |
| 4,228,397 | 10/1980 | Schmidt | 324/179 |
| 4,342,961 | 8/1982 | Zimmermann et al. | 324/179 |
| 4,483,190 | 11/1984 | Cornett | 73/167 |
| 4,542,342 | 9/1985 | Schmidt et al. | 324/179 |
| 4,672,316 | 6/1987 | Ettel | 324/202 |
| 4,677,376 | 6/1987 | Ettel et al. | 324/179 |

*Primary Examiner*—Jay Patidar
*Attorney, Agent, or Firm*—Venable; James R. Burdett; Catherine A. Ferguson

[57] ABSTRACT

Apparatus for measuring projectile muzzle velocity with an accuracy of ±0.1% is mounted in an easily portable muzzle attachment. It operates in the following manner. A washer shaped permanent magnet is positioned on a projectile body. A position sensor containing two inductive coils is located inside the muzzle. When the projectile is fired, the magnet mounted on the projectile passes through the inductive coils, inducing a voltage in each coil. Each voltage is amplified and then fed into hysteresis and zero crossing comparators corresponding to each inductive coil. The zero crossing comparator detects when the induced voltage crosses zero. The hysteresis comparator will gate out any noise induced zero crossings. The two zero crossings are used to start and stop a digital counter which generates a velocity count signal that corresponds to the velocity of the projectile. Further noise interference rejection is obtained by encasing the muzzle extension in a magnetic metal.

22 Claims, 5 Drawing Sheets

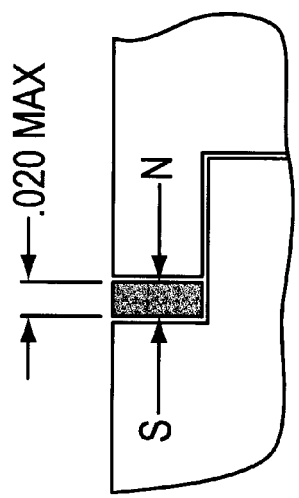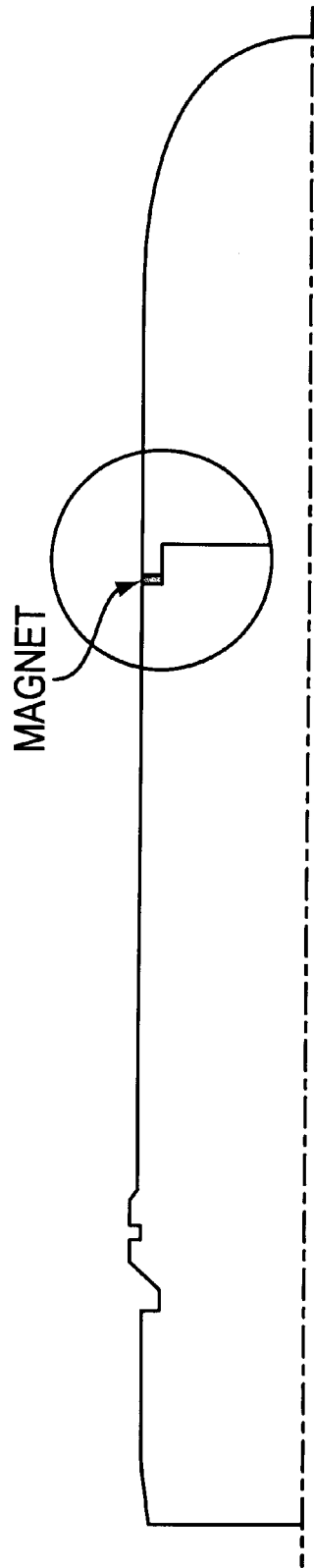

APPARATUS AND METHOD FOR
CALCULATING MUZZLE VELOCITY

CROSS REFERENCE TO RELATED APPLICATIONS

This application is related to the following applications: "One-Shot High-Output Piezoid Power Supply" by Richard P. Oberlin and Robert T. Soranno; "Ultra Low-Power Fast Start Precision Oscillator" by Richard P. Oberlin; "Accurate Ultra Low-Power Fuze Electronics" by Richard P. Oberlin and Robert T. Soranno; "Self Correcting Inductive Fuze Setter" by Richard P. Oberlin and Robert T. Soranno; and "Piezoid Electrical Gun Trigger" by Richard P. Oberlin, each of which is filed concurrently herewith, commonly owned, and incorporated herein by reference.

BACKGROUND OF THE INVENTION

The present invention relates to a new and improved means for measuring the muzzle velocity of a projectile launched from a weapon. In prior art, muzzle velocity has been measured in many different ways. Such ways have included breaking spaced wires, passing through two or more narrow light screens, measuring the Doppler shift of light/IR/radar signals reflected down a barrel, using dual magnetic or Hall-effect sensors to pick up the projectile body, and using optical sensors to detect light/dark stripes on the projectile wall.

The problem with all of the prior techniques for measuring muzzle velocity is that none can provide ±0.1% accuracy while at the same time capable of being included in an easily portable muzzle attachment. For example, light-screens and Doppler techniques can give the desired accuracy, but both require a pre-configured test range. On the other hand, optical sensors can be included in an easily portable muzzle attachment, but they are unreliable due to gas and flame blow-by obscuring the optical image. Furthermore, residue deposited on the optical sensor window when the projectile is fired obscures the image.

Sensing of projectile stripes is less sensitive to blow-by or soot, but it requires specially treated projectiles. On the other hand, multiple coil inductive sensors and Hall-effect devices can be included on an easily portable muzzle attachment, but do not meet the accuracy requirement because the gradual detection of the projectile by the sensor leads to too much triggering time variability. In addition, they tend to suffer from both zero drift and scale factor differences between the paired sensors.

SUMMARY OF THE INVENTION

It is a primary object of this invention to produce a new and improved apparatus for measuring projectile muzzle velocity, which is capable of being included in an easily portable muzzle attachment. The measurement produced can be used to set the timer in a time fuse, adjust subsequent firings, or be transmitted to a data recorder. The level of accuracy achievable with this invention was previously impossible to obtain in a device small enough to attach to a weapon muzzle.

Attachment of the velocity sensor to the weapon's muzzle is required to use the velocity measurement in certain situations. If the velocity sensor cannot be attached to the projectile muzzle, then the velocity cannot be used for fuze time setting. In addition, if the velocity sensor is not positioned on the muzzle, subsequent firing adjustment and transmission to a data recorder can only be accomplished using a large, semi-fixed set-up. Increasing the accuracy of a muzzle velocity sensor positioned on the muzzle increases the range and flexibility of situations in which muzzle velocity sensing can be utilized.

The muzzle velocity sensor according to the present invention achieves its accuracy by a combination of factors including: (1) providing a "hard" or sensitive "S" shaped transfer function over a small distance around each break point; (2) using a very wideband/rapid response; (3) using high sensitivity zero crossover breakpoint sensing; (4) decreasing the sensor's susceptibility to noise; and (5) providing increased immunity to scale factor changes.

The invention will be better understood and objects other than those set forth above will become more apparent when consideration is given to the following detailed description thereof. Such description makes reference to the annexed drawings wherein throughout the various figures of the drawings, there have been generally used the same reference terminology to denote the same or analogous components and specifically wherein:

BRIEF DESCRIPTION OF THE DRAWINGS

FIGS. 2A and 2B illustrate thin, washer shaped permanent magnet mounted on a projectile for velocity sensing;

DETAILED DESCRIPTION OF THE PREFERRED EMBODIMENTS

A thin washer-shaped permanent magnet is positioned on the projectile body so that its outside diameter is located close to that of the projectile's main outside diameter as depicted in FIGS. 2A and 2B. The magnet has two faces and is magnetized so that one face is the positive, or north, pole and the other face is the negative, or south, pole. The north face faces the direction in which the projectile will exit the muzzle of the weapon.

Figure 1:
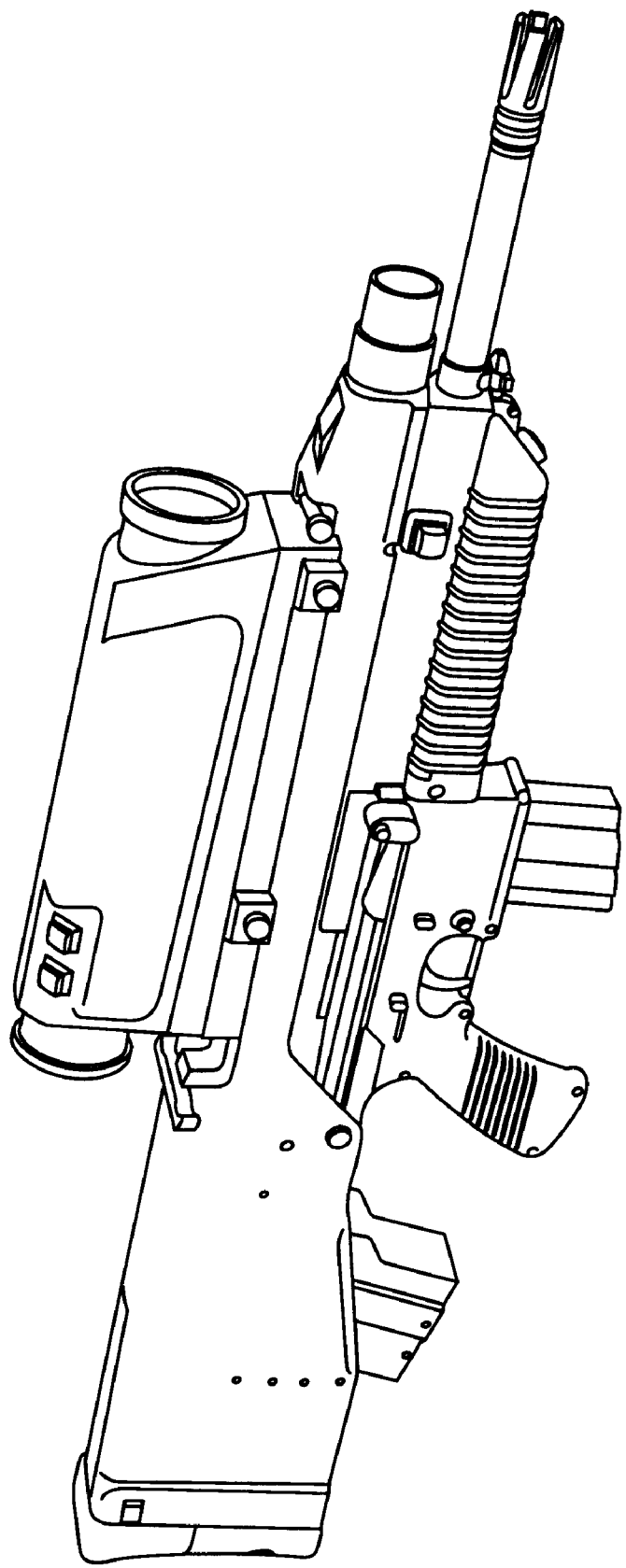
FIG. 1 is a top, right-side perspective view of a combination weapon which incorporates the muzzle velocity sensor according to the present invention.
Figure 3B:
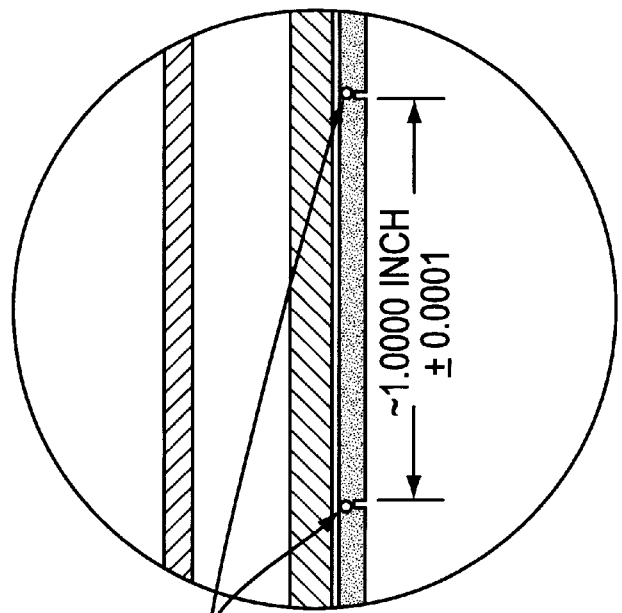
FIGS. 3A and 3B illustrate two thin inductive pickup coils mounted 1.0000±0.00001 inch apart shown in a fuze setter assembly on a projectile.
Figure 3A:
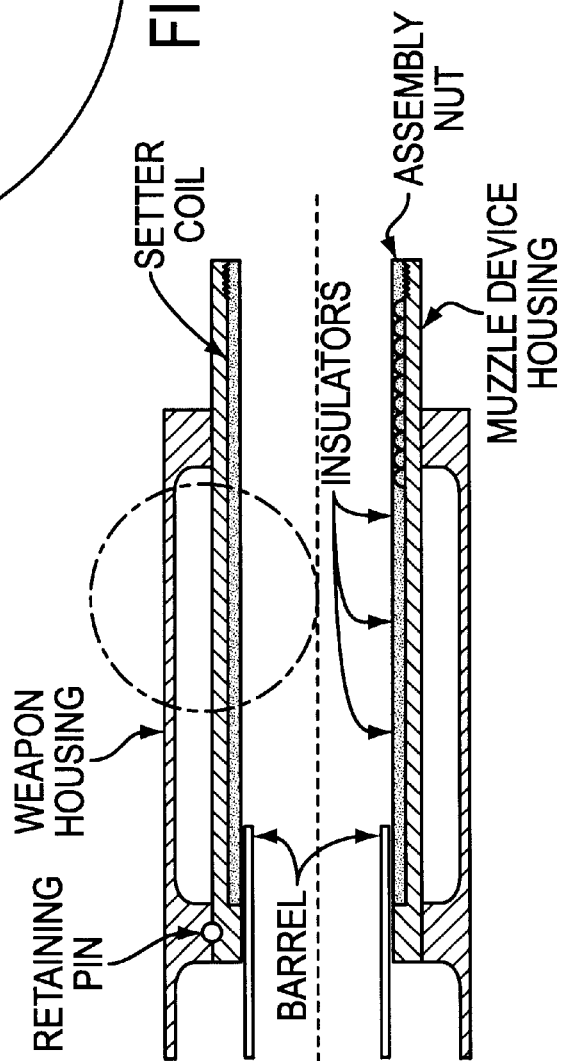
Figure 4:
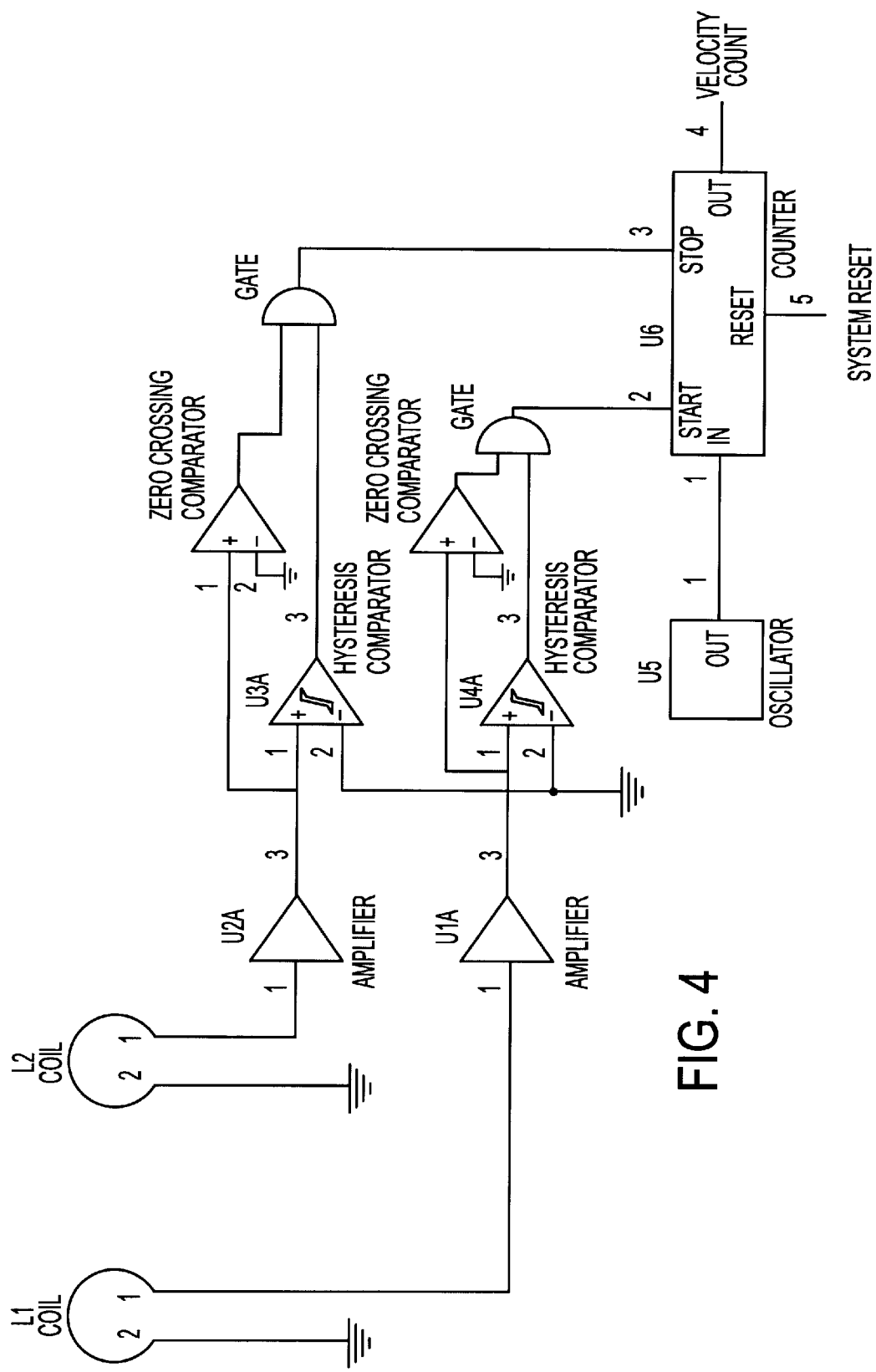
FIG. 4 is a schematic circuit diagram showing the components, which comprise the position sensor located inside the muzzle.

A position sensor is located inside the muzzle as depicted in FIGS. 3A and 3B. It is comprised of a first and a second inductive pickup coil, a first and a second a wide bandwidth preamplifier, a first and a second comparator, a digital counter and a high precision frequency source as indicated in FIG. 4.

The first and second thin inductive pickup coils are mounted a known separation apart. One of the advantages of this invention is that a spacer inserted into the weapon's muzzle can easily set the separation of the two coils. This spacer can be made from a zero temperature coefficient material or the temperature of the spacer can be measured and used in a compensation term. The aforementioned full-scale demo was done using a 0.9959-inch separation, with a 0.0001-inch positional uncertainty, in a barrel extension (see FIG. 5).

Each pickup coil can be a single wire, a thin disk, or laminate on one of the ends of the spacer. In a preferred embodiment, a full-scale demonstration was done using 0.020-inch diameter wire. Each pick-up coil is connected to the input of a corresponding wide bandwidth preamplifier. Each wide bandwidth preamplifier is connected to a corresponding pair of comparators. Each comparator has two inputs (a positive and a negative) and one output. The negative input of each comparator is used as a reference input and tied to ground. The positive input of each comparator is connected to the output of the corresponding wide bandwidth preamplifier. The output of the zero crossing comparator corresponding to the first inductive pickup coil is connected to the "start" input of the digital counter. The output of the comparator corresponding to the second inductive pickup coil is connected to the "stop" input of the aforementioned digital counter. In this manner, the two comparators together are used as a gating circuit to turn the digital counter on and off. In a preferred embodiment, a comparator with hysteresis, also known as a hysteresis comparator or a Schmitt Trigger is used in each coil circuit to gate out any noise induced zero crossings except when the projectile is transitioning the sensor area.

A high precision frequency source, 0.05% or better, is connected to the "in" input of the digital counter and is used as a clock input to the digital counter. The output count of the digital counter is the velocity count and appears on the counter's "out" pin. A system-reset signal is connected to the "reset" pin of the digital counter.

The muzzle velocity sensor according to the present invention operates in the following manner. When the projectile is fired through a muzzle, the magnet, which is attached to the projectile, passes through the first coil. When the magnet passes through the first coil, the relative movement between the magnet and the coil induces a voltage in the coil. The induced voltage is plotted in FIG. 5. As the north pole of the magnet approaches the first coil, it induces a positive voltage, which grows in magnitude as the magnet passes through the coil. This voltage will exceed a threshold voltage "A" and continue to increase until it reaches a peak positive value. As the north pole exits the coil and the south pole approaches the coil, the voltage induced in the coil first reduces in magnitude until it reaches zero volts and then decreases, passing a threshold voltage "B," until it reaches a peak negative value. As the magnet exits the coil, this negative voltage reduces in magnitude eventually tapering off. Similarly, when the magnet passes through the second coil, the voltage illustrated in FIG. 5 is induced in the second coil.

As previously mentioned, the first coil voltage is input to the positive input of its corresponding comparator and the output of the zero crossing comparator is connected to the "start" input of the digital counter (shown in FIG. 4) through a gate controlled by its hysteresis comparator. As also previously mentioned, in a preferred embodiment the hysteresis comparator is also known as a Schmitt trigger. The comparator pairs detect the zero crossing from a positive to a negative magnetic induction in the following manner. The hysteresis comparator is in the off state (the output of the comparator is a digital "zero") until the induced signal strength from the magnet approaching the loop exceeds the triggering threshold "A" shown in FIG. 5. At this point the hysteresis comparator switches to the on state (the comparator's output switches to a digital "one"). The hysteresis comparator remains on until an equal, but opposite polarity is reached at point "B" and the comparator's output switches back to a digital "zero." The zero crossing comparator's output is indeterminate when no signal is induced in the coil. When the signal builds up as the projectile traverses the sensing area, the zero crossing comparator's output is forced to a digital "one" by the positive induced voltage signal (see FIG. 5) and then quickly switches to the digital "zero" state as the signal goes through zero, remaining there as long as the signal remains negative. The output of the gate is a digital "zero" until both the hysteresis and zero crossing comparator outputs are digital "ones". This occurs only in the area between threshold "A" and the zero crossing point in FIG. 5. The gate output then drops from a digital "one" to a digital "zero" as the zero crossing point of the signal passes. This falling edge causes the counter to begin counting. Because noise effects will be of much smaller amplitude than the trigger threshold, the only zero transition that is passed onto the counter is the desired one between points "A" and "B" on each coil output. This allows the use of high sensitivity zero crossover breakpoint sensing while, at the same time, providing a reduction in noise susceptibility.

Figure 5:
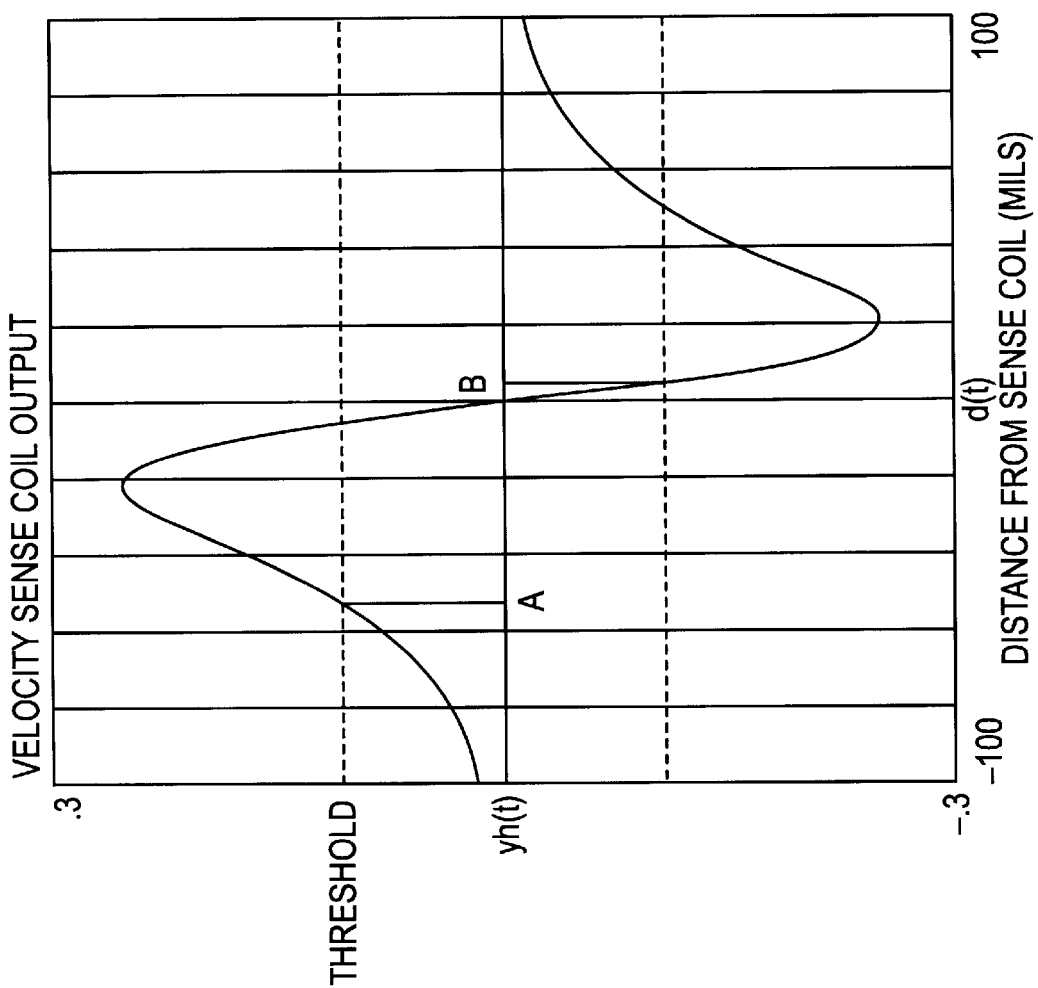
FIG. 5 is a plot of the voltage induced in each inductive pickup coil versus time which illustrates the threshold sensitivities at which the comparator is gated on and off.

Next, the magnet will pass through the second coil, which also induces a voltage as illustrated in FIG. 5. As mentioned previously, this second coil voltage is input to the positive input of its corresponding comparator pairs and the output of the corresponding gate is connected to the "stop" input of the digital counter (shown in FIG. 5). The comparators used are the same types as those used with the first coil. The comparator pair detects the zero crossing from a positive to a negative magnetic induction in the following manner. The hysteresis comparator is in the off state (the output of the comparator is a digital "zero") until the induced signal strength from the magnet approaching the loop exceeds the triggering threshold "A" shown in FIG. 5. At this point the comparator switches to the on state (the comparator's output switches to a digital "one"). This comparator remains on until an equal, but opposite polarity is reached at point "B" and the comparator's output switches back to a digital "zero." The zero crossing comparator's output is indeterminate when no signal is induced in the coil. When the signal builds up as the projectile traverses the sensing area, the zero crossing comparator's output is forced to a digital "one" by the positive induced voltage signal (see FIG. 5) and then quickly switches to the digital "zero" state as the signal goes through zero, remaining there as long as the signal remains negative. The output of the gate is a digital "zero" until both the hysteresis and zero crossing comparator outputs are digital "ones". This occurs only in the area between threshold "A" and the zero crossing point in FIG. 5. The gate output then drops from a digital "one" to a digital "zero" as the zero crossing point of the signal passes. This falling edge causes the counter to stop counting. Because noise effects will be of much smaller amplitude than the trigger threshold, the only zero transition that is passed onto the counter is the desired one between points "A" and "B" on each coil output. This allows the use of high sensitivity zero crossover breakpoint sensing while, at the same time, providing a reduction in noise susceptibility.

To calculate the muzzle velocity, the separation distance between the two pickup coils (as mentioned before in a preferred embodiment the separation was 0.9959 inches) is divided by the time between the two crossing events. The time between crossing events is calculated by multiplying the velocity count output from the digital counter by the frequency of the frequency source. In full-scale temperature testing, a muzzle velocity error of ±0.07% 1 sigma was demonstrated over temperatures from −40° F. to +120° F.

One of the key discoveries of this invention is that the accuracy of the velocity sensing is dependent on the slope of the magnetic field transition from positive to negative as the projectile travels through the position sensor. The slope is much greater when the north and south poles of the magnet are close together. Therefore, the thickness of the magnet is critical to achieving velocity-sensing accuracy. In a preferred embodiment, full-scale demonstrations were done with 0.020-inch wafer magnets, and thinner magnets yet would improve the velocity sensing accuracy still more.

Further noise interference rejection is obtained by encasing the muzzle extension in a magnetic metal (iron, steel, or nickel). The muzzle extension (being several bore lengths long) acts as a circular waveguide. Electromagnetic energy cannot propagate into it unless that energy has a wavelength below the cutoff wavelength, which is about 1 GHz for an oversize 20 mm bore. Therefore, the magnetic metal extension electrostatically and magnetically attenuates any external signal.

When the projectile passes through the muzzle device, its presence raises this cutoff frequency significantly. However, the muzzle sensor circuit is tuned to reject any signals over 50 MHz, and therefore, easily rejects any signals of 1 GHz or higher.

While there are shown and described present preferred embodiments of the invention, it is distinctly understood that the invention is not limited thereto, but may be otherwise variously embodied and practiced within the scope of the following claims.

What is claimed is:

1. Apparatus for measuring the muzzle velocity of a projectile, comprising:

a washer-shaped magnet having a north pole and a south pole that is positioned on a projectile body so that its outside diameter is located close to that of the projectile's outside diameter, and the south pole of said magnet faces the direction in which the projectile will exit the muzzle;

a position sensor having a first and a second inductive coil mounted a known separation apart, wherein a voltage is induced in each coil when said magnet passes through said inductive coil;

a first and a second wide bandwidth preamplifier, each having an input and an output;

first and a second comparator pairs, each comparator in said comparator pairs having a positive input, a negative input connected to and electrically coupled to ground voltage, and an output;

a digital counter having a start input, a stop input, an in input, a reset input and an output; and a high precision frequency source connected to and electrically coupled to the input of said digital counter to provide a clock signal to said digital counter;

wherein the input of said first wide bandwidth preamplifier is connected to and electrically coupled to said first inductive pickup coil to amplify the voltage induced in said first inductive coil when said magnet passes through it and the input of said second wide bandwidth preamplifier is connected to and electrically coupled to said second inductive coil to amplify the voltage induced in said second coil when said magnet passes through it;

wherein the positive inputs of said first comparator pair are connected to and electrically coupled to the output of said first wide bandwidth preamplifier and the positive inputs of said second comparator pair are connected to and electrically coupled to the output of said second wide bandwidth preamplifier;

wherein the outputs of said first comparator pair are connected to and electrically coupled to the start input of said digital counter to start said counter when the voltage induced in said first inductive coil crosses zero; and wherein the outputs of said second comparator pair are connected to and electrically coupled to the stop input of said digital counter to stop said counter when the voltage induced in said second coil crosses zero, and thereby generate a velocity count signal, corresponding to the velocity of the projectile, on said output of said digital counter.

2. Apparatus according to claim 1, wherein said first and second comparator pairs each comprise a hysteresis comparator and a zero crossing comparator.

3. Apparatus according to claim 2, further comprising a pair of gates, each of which is connected to and electrically coupled between the outputs of a respective one of said first and second comparator pairs and its respective start or stop input of said counter.

4. Apparatus according to claim 3, wherein the output of each said gate comprises a digital "zero" until both of the outputs of its respective comparator pair are digital "ones".

5. Apparatus according to claim 1, wherein said magnet is less than or equal to about 0.020 inches thick.

6. Apparatus according to claim 1, wherein said first and second comparator pairs each comprise a Schmitt trigger and a zero crossing comparator.

7. Apparatus according to claim 1, wherein each of said inductive coils is a single wire.

8. Apparatus according to claim 1, wherein each of said inductive coils is a thin disk.

9. Apparatus according to claim 1, wherein each of said inductive coils is laminated on one of the ends of a spacer.

10. Apparatus according to claim 1, wherein said pickup coils are separated by a spacer inserted into a muzzle.

11. Apparatus according to claim 10, wherein said spacer is made from a zero temperature coefficient material.

12. Apparatus according to claim 10, wherein the temperature of the spacer is measured and used in a compensation term.

13. Apparatus according to claim 10, wherein the spacer has a positional uncertainty of 0.0001 inch.

14. Apparatus according to claim 1, wherein said muzzle is encased in a magnetic metal so that the muzzle acts as a waveguide and filters out high frequency noise.

15. Apparatus according to claim 14, wherein said magnetic metal is iron.

16. Apparatus according to claim 14, wherein said magnetic metal is steel.

17. Apparatus according to claim 14, wherein said magnetic metal is nickel.

18. Apparatus according to claim 1, wherein a time between two crossing events is calculated by multiplying the velocity count signal from said output of said digital counter by the frequency output of said high precision frequency source.

19. Apparatus according to claim 18, wherein the muzzle velocity is calculated by dividing the known separation apart between the first and second inductive coils by the time between two crossing events.

20. A method of calculating a muzzle velocity comprising the steps of:

generating a start input signal to a digital counter, when a voltage induced in a first coil decreases in magnitude from a positive voltage to a negative voltage crossing the zero voltage point, based on when a second pole of a magnet mounted on a projectile crosses said first inductive coil;

commencing a counting operation of said digital counter based on said start input signal;

generating a stop input signal to a digital counter when a voltage induced in a second coil decreases in magnitude from a positive voltage to a negative voltage crossing the zero voltage point, based on when the second pole of the magnet mounted on the projectile crosses said second inductive coil;

ceasing the counting operation of said digital counter based on said stop input signal;

determining a velocity count by retrieving an output of said digital counter;

retrieving a known frequency of a high precision frequency source;

calculating a time between said start input signal and said stop input signal by multiplying said velocity count by the output frequency of said high precision frequency source; and dividing a known separation apart distance by the time between said start input signal and said stop input signal.

21. A method of calculating a muzzle velocity comprising the steps of:

generating a start input signal to a digital counter when a voltage induced in a first coil decreases in magnitude from a positive voltage to a negative voltage crossing the zero voltage point, based on when a second pole of a magnet mounted on a projectile crosses said first inductive coil;

commencing a counting operation of said digital counter based on said start input signal;

generating a stop input signal to a digital counter when a voltage induced in a second coil decreases in magnitude from a positive voltage to a negative voltage crossing the zero voltage point, based on when the second pole of the magnet mounted on the projectile crosses said second inductive coil;

ceasing the counting operation of said digital counter based on said stop input signal;

determining a velocity count by retrieving an output of said digital counter; and calculating the muzzle velocity by dividing a known separation distance apart between said first inductive coil and said second inductive coil by the time between said start input signal and said stop input signal.

22. The method according to claim 21, wherein said calculating step further comprises the steps of:

retrieving a known frequency of a high precision frequency source;

calculating a time between said start input signal and said stop input signal by multiplying said velocity count by the output frequency of said high precision frequency source; and dividing a known separation apart distance by the time between said start input signal and said stop input signal.

* * * * *